United States Patent
Sasano et al.

(10) Patent No.: US 10,363,871 B2
(45) Date of Patent: Jul. 30, 2019

(54) VEHICLE NOTIFICATION APPARATUS

(71) Applicant: DENSO CORPORATION, Kariya, Aichi-pref. (JP)

(72) Inventors: Takanori Sasano, Kariya (JP); Takahira Katoh, Kariya (JP)

(73) Assignee: DENSO CORPORATION, Kariya-city, Aichi-pref. (JP)

( * ) Notice: Subject to any disclaimer, the term of this patent is extended or adjusted under 35 U.S.C. 154(b) by 62 days.

(21) Appl. No.: 15/503,868

(22) PCT Filed: Aug. 6, 2015

(86) PCT No.: PCT/JP2015/003962
§ 371 (c)(1),
(2) Date: Feb. 14, 2017

(87) PCT Pub. No.: WO2016/027432
PCT Pub. Date: Feb. 25, 2016

(65) Prior Publication Data
US 2017/0232892 A1    Aug. 17, 2017

(30) Foreign Application Priority Data

Aug. 21, 2014 (JP) .................... 2014-168796

(51) Int. Cl.
*B60Q 9/00* (2006.01)
*B60K 35/00* (2006.01)
(Continued)

(52) U.S. Cl.
CPC .............. *B60Q 9/008* (2013.01); *B60K 35/00* (2013.01); *B60K 37/06* (2013.01); *B60N 2/90* (2018.02);
(Continued)

(58) Field of Classification Search
CPC ........ B60Q 9/008; G08G 1/166; G08G 1/167; B60K 35/00; B60K 2350/921;
(Continued)

(56) References Cited

U.S. PATENT DOCUMENTS 8,599,027 B2 * 12/2013 Sanchez ................ A61B 3/113
340/435
2007/0106475 A1    5/2007 Kondoh
(Continued)

FOREIGN PATENT DOCUMENTS

JP    2000172994 A    6/2000
JP    2007153307 A    6/2007
(Continued)

OTHER PUBLICATIONS

Toshihiro Hiraoka et al., "Collision Risk Evaluation Based on Deceleration for Collision Avoidance", SSI2010, vol. 47, No. 11, 534/540 (2011).

*Primary Examiner* — Nga X Nguyen
(74) *Attorney, Agent, or Firm* — Harness, Dickey & Pierce, P.L.C.

(57) ABSTRACT

A vehicle notification apparatus is equipped to a subject vehicle having a notification portion for providing a notification to an occupant, and outputs, to the notification portion, a notification signal for providing the notification about a non-subject vehicle. The vehicle notification apparatus includes a determination portion determining whether the subject vehicle is travelling on a road where a lane change is allowed, and a notification determination portion determining whether to output the notification signal to the notification portion according to a distance between the subject vehicle and the non-subject vehicle and a relative speed of the non-subject vehicle with respect to the subject vehicle when the determination portion determines that the (Continued)

subject vehicle is travelling on the road where the lane change is allowed.

4 Claims, 11 Drawing Sheets

(51) Int. Cl.
  *B60N 2/40* (2006.01)
  *G08G 1/16* (2006.01)
  *B60N 2/90* (2018.01)
  *B60K 37/06* (2006.01)

(52) U.S. Cl.
  CPC ............. *G08G 1/166* (2013.01); *G08G 1/167* (2013.01); *B60K 2350/1072* (2013.01); *B60K 2350/1084* (2013.01); *B60K 2350/2052* (2013.01); *B60K 2350/2065* (2013.01); *B60K 2350/921* (2013.01); *B60N 2002/981* (2018.02)

(58) Field of Classification Search
  CPC .... B60K 2350/2052; B60K 2350/1072; B60K 2350/2065; B60K 37/06; B60K 2350/1084; B60N 2/44; B60N 2002/4485; B60N 2/90; B60N 2002/981
  USPC .................................................. 701/300–301
  See application file for complete search history.

(56) References Cited

U.S. PATENT DOCUMENTS

| | | | |
|---|---|---|---|
| 2011/0190972 A1* | 8/2011 | Timmons | G01C 21/34 701/31.4 |
| 2011/0293145 A1 | 12/2011 | Nogami et al. | |
| 2015/0035663 A1* | 2/2015 | Sugano | G08G 1/166 340/436 |

FOREIGN PATENT DOCUMENTS

| | | |
|---|---|---|
| JP | 2009184554 A | 8/2009 |
| JP | 2011134103 A | 7/2011 |
| JP | 2015011458 A | 1/2015 |
| WO | WO-2010122747 A1 | 10/2010 |

\* cited by examiner

VEHICLE NOTIFICATION APPARATUS

CROSS REFERENCE TO RELATED APPLICATIONS

This application is a U.S. National Phase Application under 35 U.S.C. 371 of International Application No. PCT/JP2015/003962 filed on Aug. 6, 2015 and published in Japanese as WO 2016/027432 A1 on Feb. 25, 2016. This application is based on and claims the benefit of priority from Japanese Patent Application No. 2014-168796 filed on Aug. 21, 2014. The entire disclosures of all of the above applications are incorporated herein by reference.

TECHNICAL FIELD

The present disclosure relates to a vehicle notification apparatus which is installed to a vehicle having a notification portion providing notification to an occupant of the vehicle and controls the notification portion to provide notification to the occupant.

BACKGROUND ART

A vehicle notification apparatus in the related art is installed to a subject vehicle having a notification portion providing notification to an occupant of the vehicle, and the vehicle notification apparatus controls the notification portion to provide notification to the occupant. Patent Literature 1 discloses a safe driving assistance system including the vehicle notification apparatus. According to the disclosure, a determination is made with presence of a non-subject vehicle within a warning range as determination criteria, and determines whether to give a warning based on the determination result. When the presence of the non-subject vehicle is determined, a warning is given by displaying an image on a head-up display together with a sound from a speaker. In short, a warning is given according to a distance between the subject vehicle and the non-subject vehicle.

PRIOR ART LITERATURE

Patent Literature

[Patent Literature 1] JP 2009-184554 A

SUMMARY OF INVENTION

The following will describe a relation of a distance between a subject vehicle and a non-subject vehicle or a relative speed of the non-subject vehicle with respect to the subject vehicle to a risk that the subject vehicle collides with the non-subject vehicle. For example, given a same distance, the risk is low when the relative speed is low whereas the risk is most probably increased with an increase of the relative speed. Hence, it seems better to provide notification appropriately according to circumstances. However, a warning is given according to a distance without any exception by a determination in Patent Literature 1. Hence, the device in the related art fails to alert an occupant to avoid a collision with a non-subject vehicle in a satisfactory manner while reducing bothersome notification provided to occupants of the subject vehicle.

In view of the foregoing difficulties, it is an object of the present disclosure to provide a vehicle notification apparatus capable of alerting an occupant to avoid a collision with a non-subject vehicle and reducing bothersome notification provided to occupants of a subject vehicle.

According to an aspect of the present disclosure, a vehicle notification is equipped to a subject vehicle having a notification portion for providing a notification to an occupant, and outputs, to the notification portion, a notification signal for providing the notification about a non-subject vehicle. The vehicle notification apparatus includes a determination portion determining whether the subject vehicle is travelling on a road where a lane change is allowed, and a notification determination portion determining whether to output the notification signal to the notification portion according to a distance between the subject vehicle and the non-subject vehicle and a relative speed of the non-subject vehicle with respect to the subject vehicle when the determination portion determines that the subject vehicle is travelling on the road where the lane change is allowed. When the subject vehicle and a rearward non-subject vehicle following the subject vehicle are travelling in different lanes and no forward non-subject vehicle is travelling in front of the subject vehicle in a same lane, the notification determination portion does not output the notification signal to the notification portion without consideration of the distance to the rearward non-subject vehicle and the relative speed of the rearward non-subject vehicle.

According to the apparatus configured as above, when the subject vehicle is present on a road where a lane change is allowed, the presence or the absence of a notification signal of notification about a non-subject vehicle is determined according to a distance between the subject vehicle and the non-subject vehicle and a relative speed of the non-subject vehicle with respect to the subject vehicle. When configured as above, whether a collision is avoidable by a lane change is taken into consideration when the presence or the absence of notification is determined. In addition, even when the distance is same, the relative speed is taken into consideration when a risk of a collision is considered. Hence, notification can be provided appropriately according to the circumstance. Consequently, the vehicle notification apparatus is capable of alerting the occupant to avoid a collision with the non-subject vehicle while reducing bothersome notification provided to occupants of the subject vehicle.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

Figure 1:
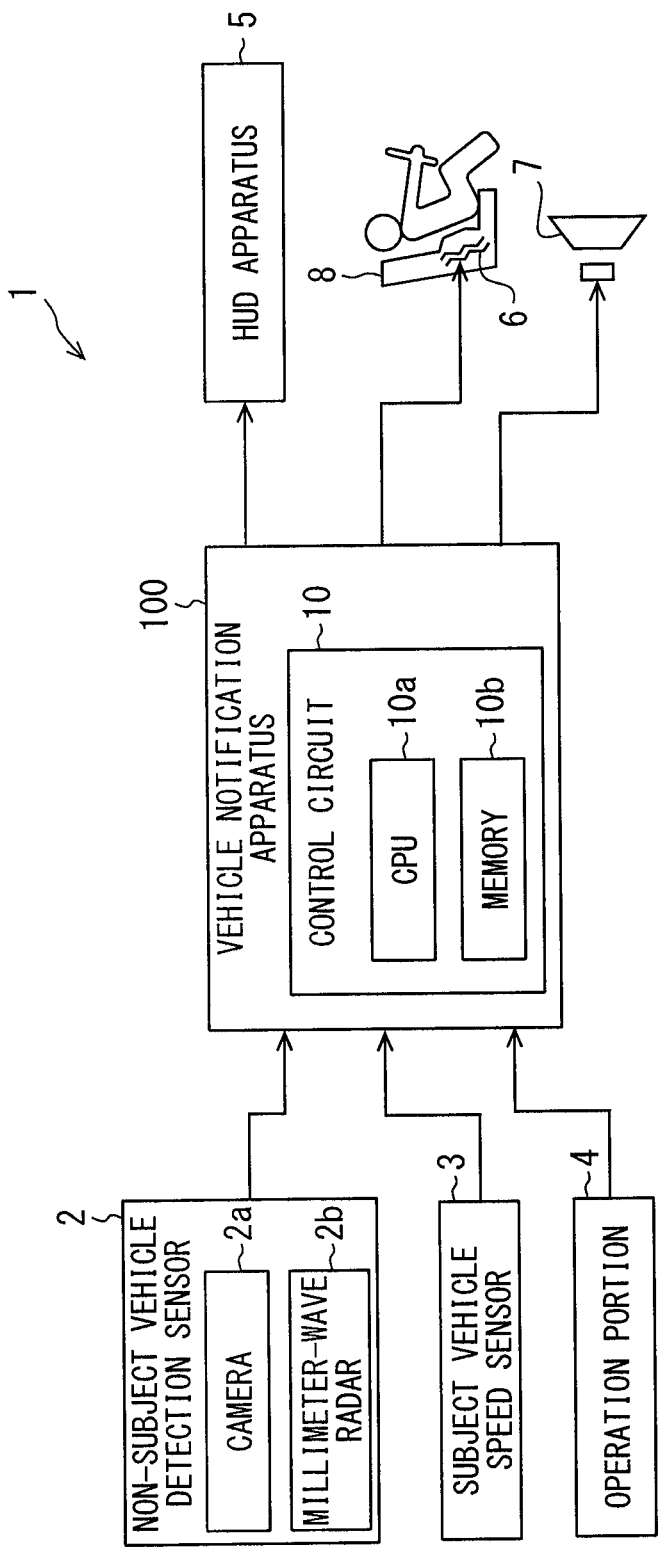
FIG. 1 is a block diagram illustrating a vehicle notification apparatus equipped to a subject vehicle in a first embodiment.

Hereinafter, embodiments of the present disclosure will be described according to the drawings. In respective embodiments below, a description is omitted where appropriate by labeling equivalent components with same reference numerals. When only a part of a configuration is described in the respective embodiments, a configuration in any other embodiment described earlier is applicable to a rest of the configuration. Besides a combination of configurations explicitly described in the respective embodiments, configurations of two or more embodiments can be combined partially even such a combination is not explicitly described unless a conflict occurs from the combination.

First Embodiment

A vehicle notification apparatus 100 according to a first embodiment of the present disclosure shown in FIG. 1 is equipped to a subject vehicle 1 which is an automobile. The vehicle notification apparatus 100 is capable of performing communications via an in-vehicle LAN with components provided to the subject vehicle 1, such as a non-subject vehicle detection sensor 2, a subject vehicle speed sensor 3, an operation portion 4, a head-up display apparatus 5 (hereinafter, abbreviated as HUD apparatus), vibration devices 6 equipped to a driver's seat 8, and a speaker 7. The vehicle notification apparatus 100 is capable of outputting a command signal of notification about a non-subject vehicle to the HUD apparatus 5, the vibration devices 6, and the speaker 7 according to inputs from the non-subject vehicle detection sensor 2, the subject vehicle speed sensor 3, and the operation portion 4. Upon receipt of a command to provide notification, the HUD apparatus 5, the vibration devices 6, and the speaker 7 provide notification about a non-subject vehicle to an occupant of the subject vehicle 1. The occupant of the subject vehicle 1 recognizes the notification about a non-subject vehicle when the occupant perceives the notification by senses of sight, touch, and hearing.

The subject vehicle speed sensor 3 is a sensor detecting a vehicle speed Vo of the subject vehicle 1 (hereinafter, referred to as the subject vehicle speed). More specifically, the subject vehicle speed sensor 3 detects a rotation speed of an axel of the subject vehicle 1 and outputs a vehicle speed signal corresponding to the rotation speed to the vehicle notification apparatus 100.

The non-subject vehicle detection sensor 2 is a sensor detecting a non-subject vehicle present near the subject vehicle 1. More specifically, the non-subject vehicle detection sensor 2 mainly includes multiple sensor elements, for example, a camera 2a and a millimeter-wave radar 2b, and outputs, to the vehicle notification apparatus 100, a detection signal which is a detection result by the sensor elements 2a and 2b.

The operation portion 4 is a portion that a driver operates for driving. In the present embodiment, in particular, the operation portion 4 corresponds to a direction indicator switch (see also FIG. 16) which turns on direction indicators 1f for indicating a right or left turn. When operated by the driver, the operation portion 4 outputs an operation signal to the vehicle notification apparatus 100.

Figure 2:
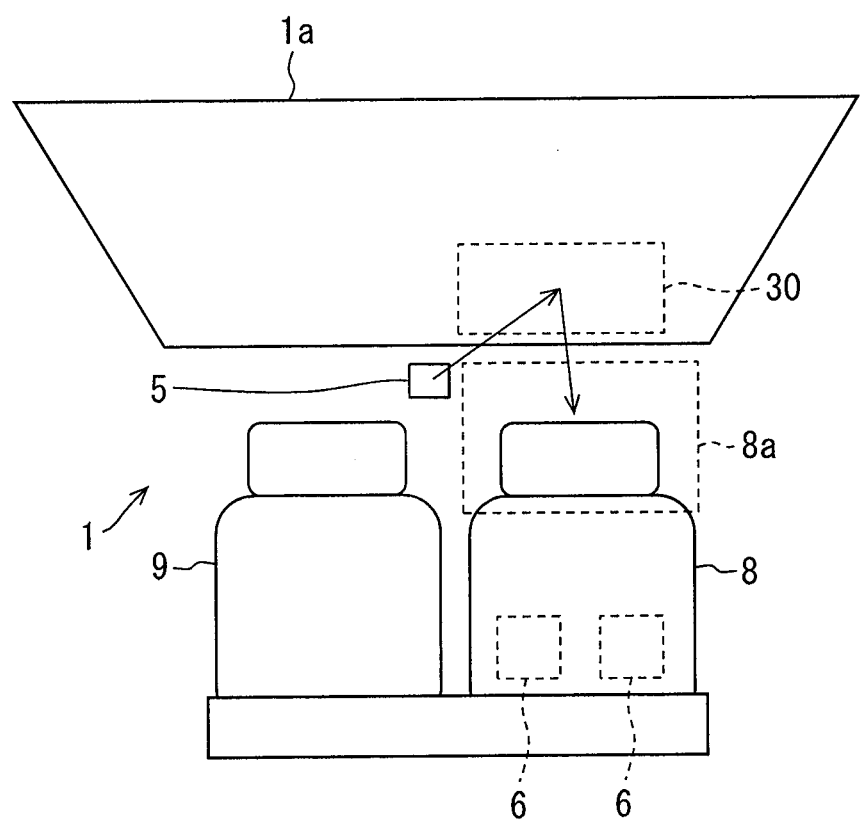
FIG. 2 is a schematic view illustrating a HUD apparatus and vibration devices equipped to the subject vehicle in the first embodiment.
Figure 3:
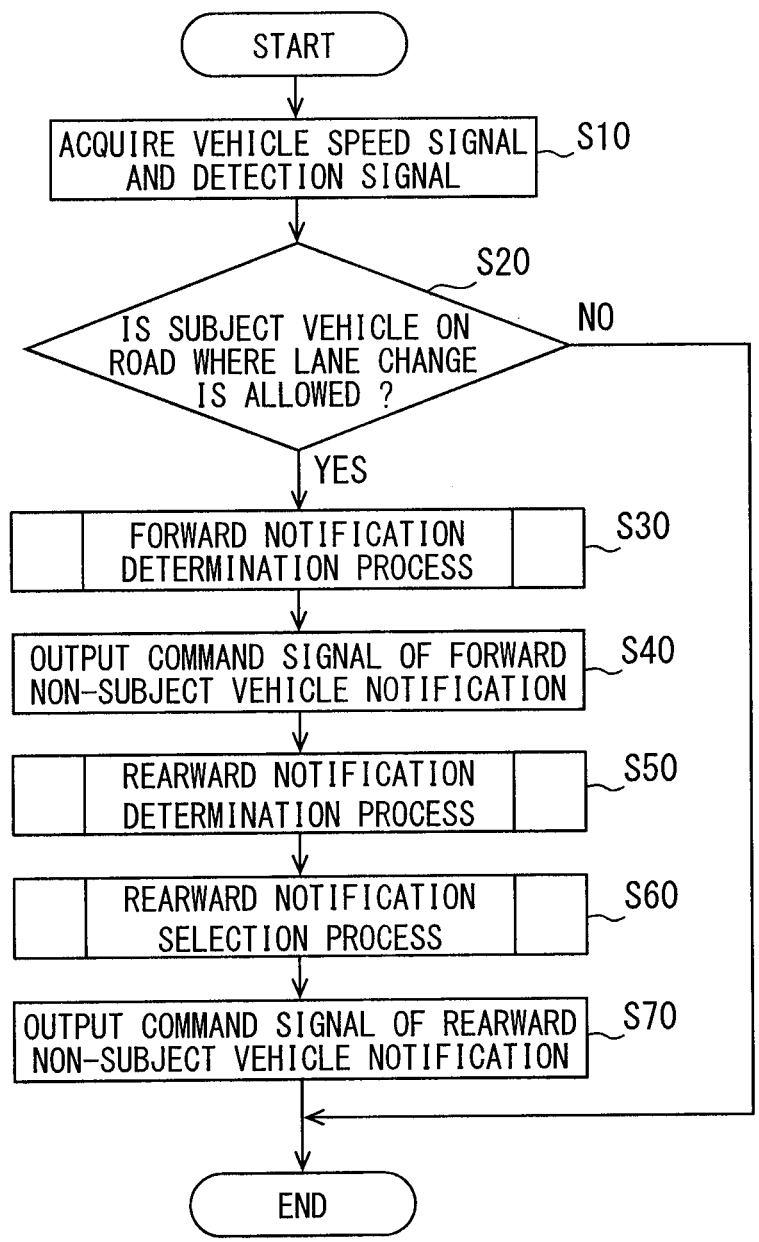
FIG. 3 is a flowchart related to the vehicle notification apparatus in the first embodiment.

As is shown in FIG. 2, the HUD apparatus 5 is a vehicle display apparatus displaying an image in a form of a visible virtual image in a visible region 8a by projecting the image onto a projection member 1a, for example, a windshield. The visible region 8a is a region in which an image 30 in the form of a virtual image is visible. In the present embodiment, the visible region 8a is set with consideration of an eyelips which is a spatial region where eye points of an occupant seated on the driver's seat 8 as the driver are possibly present. By setting the visible region 8a as above, the image 30 in the form of a virtual image is visible by the driver whereas the image 30 in the form of a virtual image is invisible to another occupant seated on a front passenger's seat 9 as an assistant. In the manner as above, the HUD apparatus 5 is capable of providing notification about a non-subject vehicle to the driver by displaying the image 30 in the form of a virtual image.

The vibration devices 6 equipped to the driver's seat 8 are disposed inside a backrest of the driver's seat 8 at two places on right and left sides. The vibration devices 6 are capable of providing notification about a non-subject vehicle to the driver by individual vibration.

The speaker 7 is a device outputting a sound and capable of providing notification about a non-subject vehicle to every occupant.

As is shown in FIG. 1, the vehicle notification apparatus 100 is an electronic control unit mainly includes a control circuit 10, and the control circuit 10 includes a CPU 10a and a memory 10b. The CPU 10a is capable of performing various types of process by running computer programs pre-stored in the memory 10b. Besides the computer programs, image data or the like used by the HUD apparatus 5 is also pre-stored in the memory 10b. The control circuit 10 may include more than one CPU 10a and more than one memory 10b.

The following will describe, with reference to FIG. 3 to FIG. 6, a flowchart performed by the control circuit 10 of the vehicle notification apparatus 100 according to the first embodiment. The control circuit 10 performs the process in flowchart by running computer programs in cooperation with the HUD apparatus 5, the vibration devices 6, the speaker 7, or the like. The control circuit 10 performs the process shown in the flowchart of FIG. 3, for example, at predetermined intervals. Of command signals, a command signal when presence of notification about a non-subject vehicle is determined in step S30 or step S50 is particularly defined as a notification signal.

Firstly in step S10, a vehicle speed signal and detection signals are acquired. When process in step S10 is ended, advancement is made to step S20.

In step S20, whether the subject vehicle 1 is present on a road where a lane change is allowed is determined. In the present embodiment, the subject vehicle speed Vo is calculated from a vehicle speed signal of the subject vehicle speed sensor 3, and it is estimated that the subject vehicle 1 is present on a road where a lane change is allowed particularly when the subject vehicle speed Vo is higher than a pre-set subject vehicle speed Vos. That is to say, when the subject vehicle 1 is running at a high speed, it is presumed that the subject vehicle 1 is travelling on an expressway. Since most of expressways have two or more lanes, it is presumed that the subject vehicle 1 is present on a road where a lane change is allowed. When it is determined in step S20 that the subject vehicle 1 is present on a road where a lane change is allowed, advancement is made to step S30. Meanwhile, when a negative determination is made in step S20, the process is ended.

In step S30, forward notification determination process for notifying a forward non-subject vehicle is performed. More specifically, presence or absence of a notification signal about a forward non-subject vehicle is determined according to a distance Lp between the subject vehicle 1 and the non-subject vehicle and a relative speed Vrp of the non-subject vehicle with respect to the subject vehicle 1. When process in step S30 is ended, advancement is made to step S40.

In step S40, a command signal of notification about the forward non-subject vehicle is outputted to the HUD apparatus 5. For example, when the presence of a notification signal is determined in step S30, the notification signal is outputted as a command signal. When process in step S40 is ended, advancement is made to step S50.

In step S50, rearward notification determination process for notifying a rearward non-subject vehicle is performed. More specifically, presence or absence of a notification signal about a rearward non-subject vehicle is determined according to a distance Lf between the subject vehicle 1 and the non-subject vehicle and a relative speed Vrf of the non-subject vehicle with respect to the subject vehicle 1. When process in step S50 is ended, advancement is made to step S60.

In step S60, rearward notification selection process of for notifying the rearward non-subject vehicle is performed. More specifically, a method and a content of notification about the rearward non-subject vehicle are selected according to an operation made on the operation portion 4, the distance Lf between the subject vehicle 1 and the non-subject vehicle, and the relative speed Vrf of the non-subject vehicle with respect to the subject vehicle 1. When process in step S60 is ended, advancement is made to step S70.

In step S70, a command signal of notification about the rearward non-subject vehicle is outputted to the HUD apparatus 5, the vibration devices 6, and the speaker 7. For example, when the presence of a notification signal is determined in step S50, the notification signal is outputted as a command signal. After step S70, the process is ended.

In the present embodiment, the distances Lp and Lf between the subject vehicle 1 and the non-subject vehicles used in steps S30 and S50, respectively, are calculated mainly from a detection signal of the non-subject vehicle detection sensor 2 acquired in step S10. For example, the distances Lp and Lf between the subject vehicle 1 and the respective non-subject vehicles are acquired through analysis on a received wave of the millimeter-wave radar 2b or acquired through analysis on a captured image of the camera 2a, both of which forming the non-subject vehicle detection sensor 2, or a combination of various analyses. Likewise, the relative speeds Vrp and Vrf of the respective non-subject vehicles with respect to the subject vehicle 1 used in steps S30 and S50, respectively, are calculated mainly from a detection signal of the non-subject vehicle detection sensor 2 acquired in step S10. For example, variances in the distances Lp and Lf acquired at every detection time may be turned to the relative speeds Vrp and Vrf of the respective non-subject vehicles with respect to the subject vehicle 1. When a variance in the subject vehicle speed Vo acquired from a vehicle speed signal of the subject vehicle speed sensor 3 is large, the distances Lp and Lf and the relative speeds Vrp and Vrf are corrected using the subject vehicle speed.

As has been described, the command signals in steps S40 and S70 are signals corresponding, respectively, to a determination in step S30 and determinations (and a selection) in steps S50 and S60. When the command signals are respectively inputted into the HUD apparatus 5, the vibration devices 6, and the speaker 7, a notification state in each device is updated.

Figure 4:
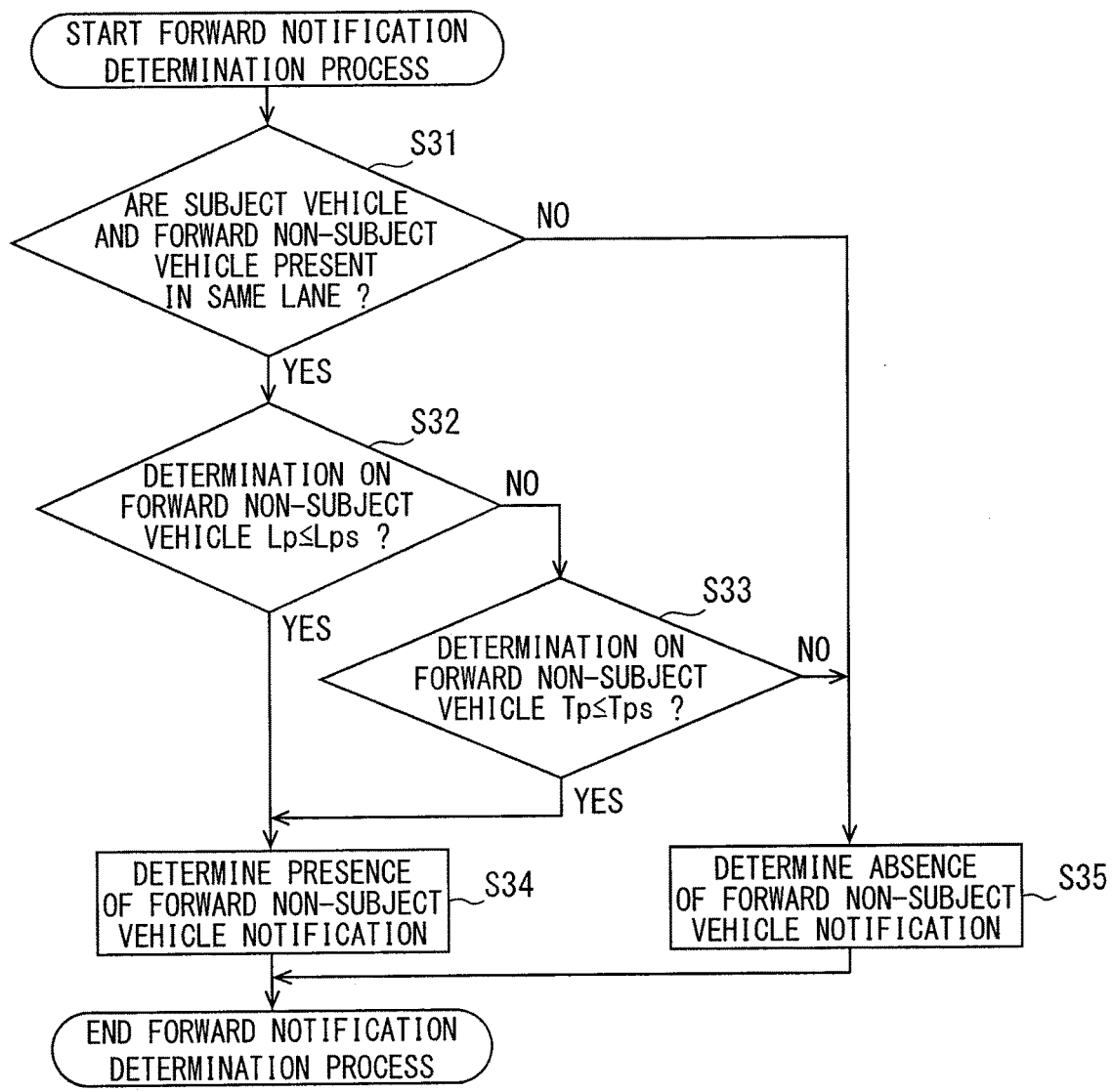
FIG. 4 is a flowchart illustrating forward notification determination process of FIG. 3.

The forward notification determination process in step S30 performed by the vehicle notification apparatus 100 will now be described more in detail using a flowchart of FIG. 4 as a sub-routine.

Firstly in step S31, whether a forward non-subject vehicle and the subject vehicle 1 are present on a same lane is determined. When a positive determination is made in step S31, advancement is made to step S32. Meanwhile, when a negative determination is made in step S31, advancement is made to step S35.

In step S32, whether the distance Lp to the forward non-subject vehicle is equal to or shorter than a pre-set distance Lps is determined. When a positive determination is made in step S32, advancement is made to step S34. Meanwhile, when a negative determination is made in step S32, advancement is made to step S33.

In step S33, whether an available duration Tp for the forward non-subject vehicle is equal to or shorter than a pre-set duration Tps is determined. When a positive determination is made in step S33, advancement is made to step S34. Meanwhile, when a negative determination is made in step S33, advancement is made to step S35.

In step S34, presence of a notification signal of notification about the forward non-subject vehicle is determined. The forward notification determination process is ended after step S34.

In step S35, absence of a notification signal of notification about the forward non-subject vehicle is determined. The forward notification determination process is ended after step S35.

The available duration Tp used in step S33 is calculated according to the distance Lp and the relative speed Vrp. More specifically, the available duration Tp is an index indicating how many seconds are left before the subject vehicle 1 collides with the non-subject vehicle given that the present relative speed Vrp is maintained, and expressed as, for example: Tp=Lp/Vrp.

Figure 7:
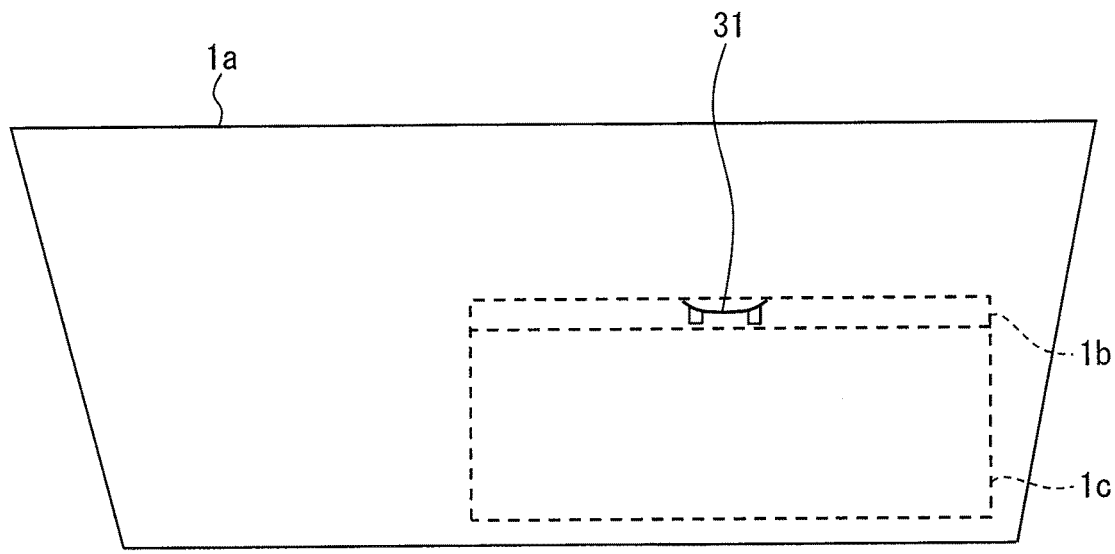
FIG. 7 is a schematic view showing an example of a notification state of the HUD apparatus in the first embodiment.
Figure 8:
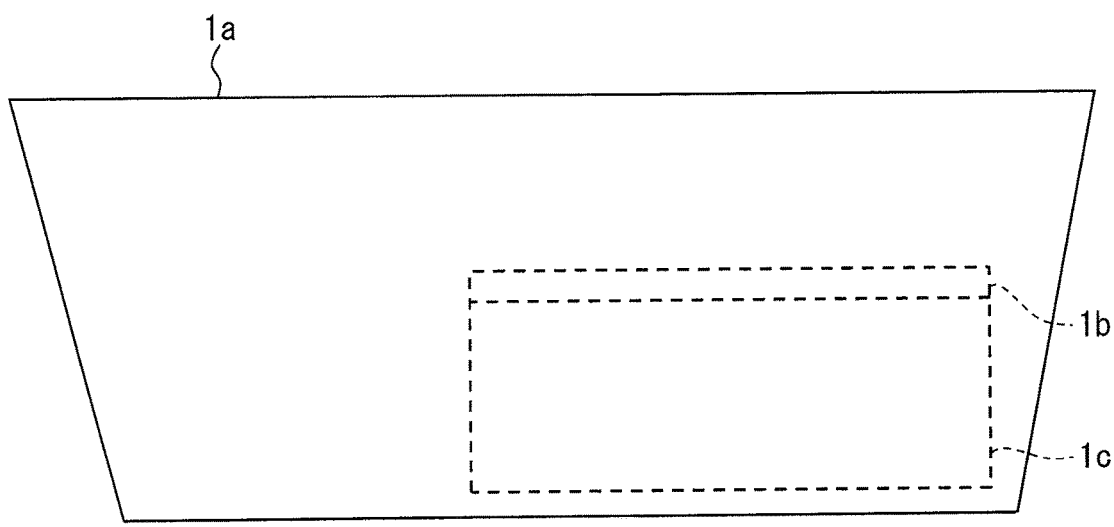
FIG. 8 is a schematic view showing another example of the notification state of the HUD apparatus in the first embodiment.

A brief description will be given to the HUD apparatus 5 when a command signal about the forward non-subject vehicle is inputted to the HUD apparatus 5 as a result of step S40 after step S34 or S35. As is shown in FIG. 7, upon input of a notification signal when the presence of a notification signal is determined, the HUD apparatus 5 updates a notification state and displays a forward notification image 31 indicating that the subject vehicle 1 is approaching the forward non-subject vehicle in the form of a virtual image in a display region 1b as notification about the forward non-subject vehicle. In the manner as above, the HUD apparatus 5 provides notification to the driver. On the other hand, as is shown in FIG. 8, the HUD apparatus 5 updates a notification state according to a command signal when the absence of notification is determined, and cancels display of the forward notification image 31 in the form of a virtual image.

Figure 5:
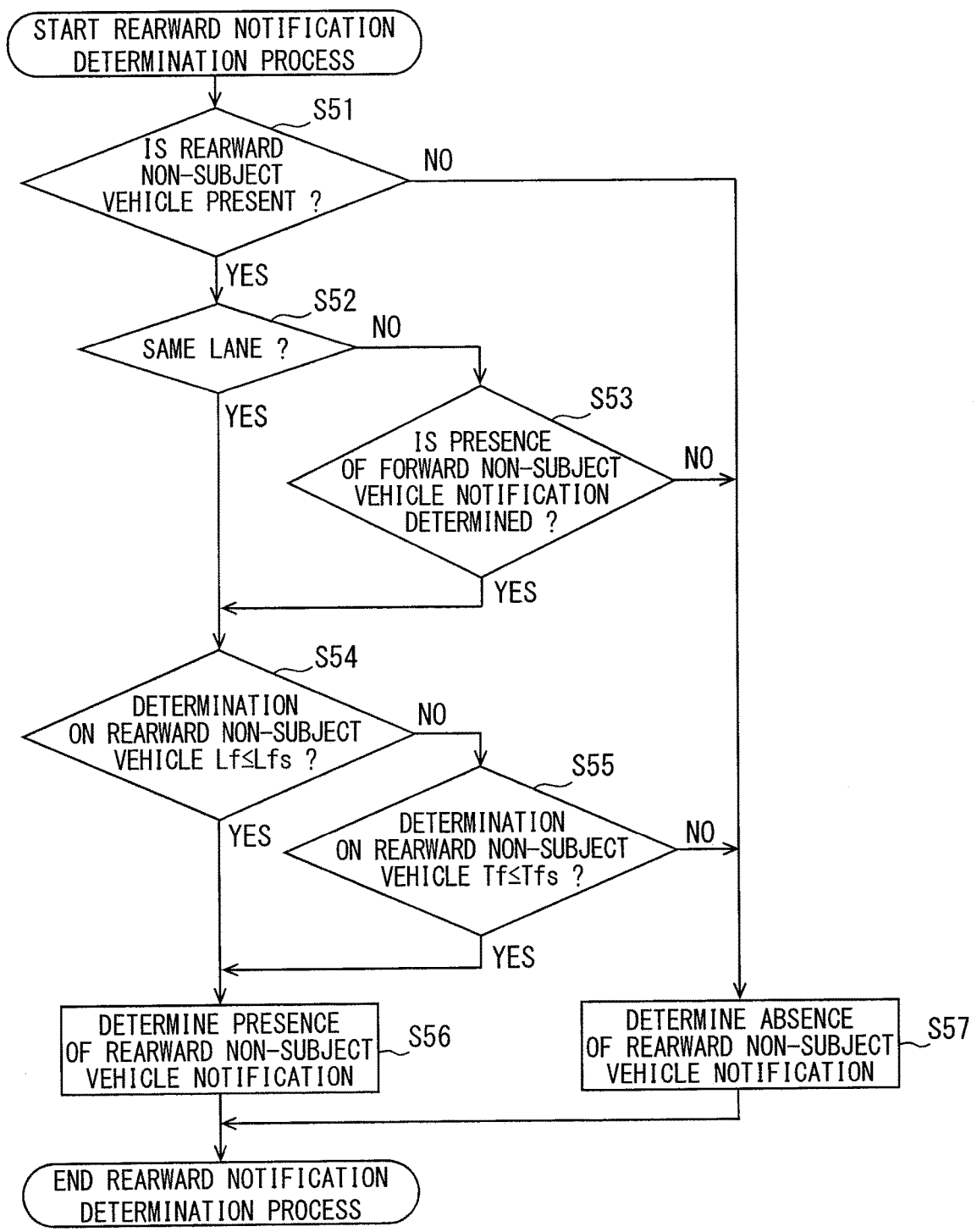
FIG. 5 is a flowchart illustrating rearward notification determination process of FIG. 3.

The rearward notification determination process in step S50 performed by the vehicle notification apparatus 100 will now be described more in detail using a flowchart of FIG. 5 as a sub-routine.

Firstly in step S51, whether a rearward non-subject vehicle is present is determined. When a positive determination is made in step S51, advancement is made to step S52. Meanwhile, when a negative determination is made in step S51, advancement is made to step S57.

In step S52, whether the rearward non-subject vehicle and the subject vehicle 1 are present on a same lane is determined. When a positive determination is made in step S52, advancement is made to step S54. Meanwhile, when a negative determination is made in step S52, advancement is made to step S53.

In step S53, a determination is made as to whether the presence of a notification signal of notification about the forward non-subject vehicle is determined by the forward notification determination process in step S30. When a positive determination is made in step S53, advancement is made to step S54. Meanwhile, when a negative determination is made in step S53, advancement is made to step S57.

In step S54, whether the distance Lf to the rearward non-subject vehicle is equal to or shorter than a pre-set distance Lfs is determined. When a positive determination is made in step S54, advancement is made to step S56. Meanwhile, when a negative determination is made in step S54, advancement is made to step S55.

In step S55, whether an available duration Tf for the rearward non-subject vehicle is equal to or shorter than a pre-set duration Tfs is determined. The available duration Tf is calculated in the same manner as the available duration Tp. When a positive determination is made in step S55, advancement is made to step S56. Meanwhile when a negative determination is made in step S55, advancement is made to step S57.

In step S56, presence of a notification signal of notification about the rearward non-subject vehicle is determined. The rearward notification determination process is ended after step S56.

In step S57, absence of a notification signal of notification about the rearward non-subject vehicle is determined. The rearward notification determination process is ended after step S57.

Figure 6:
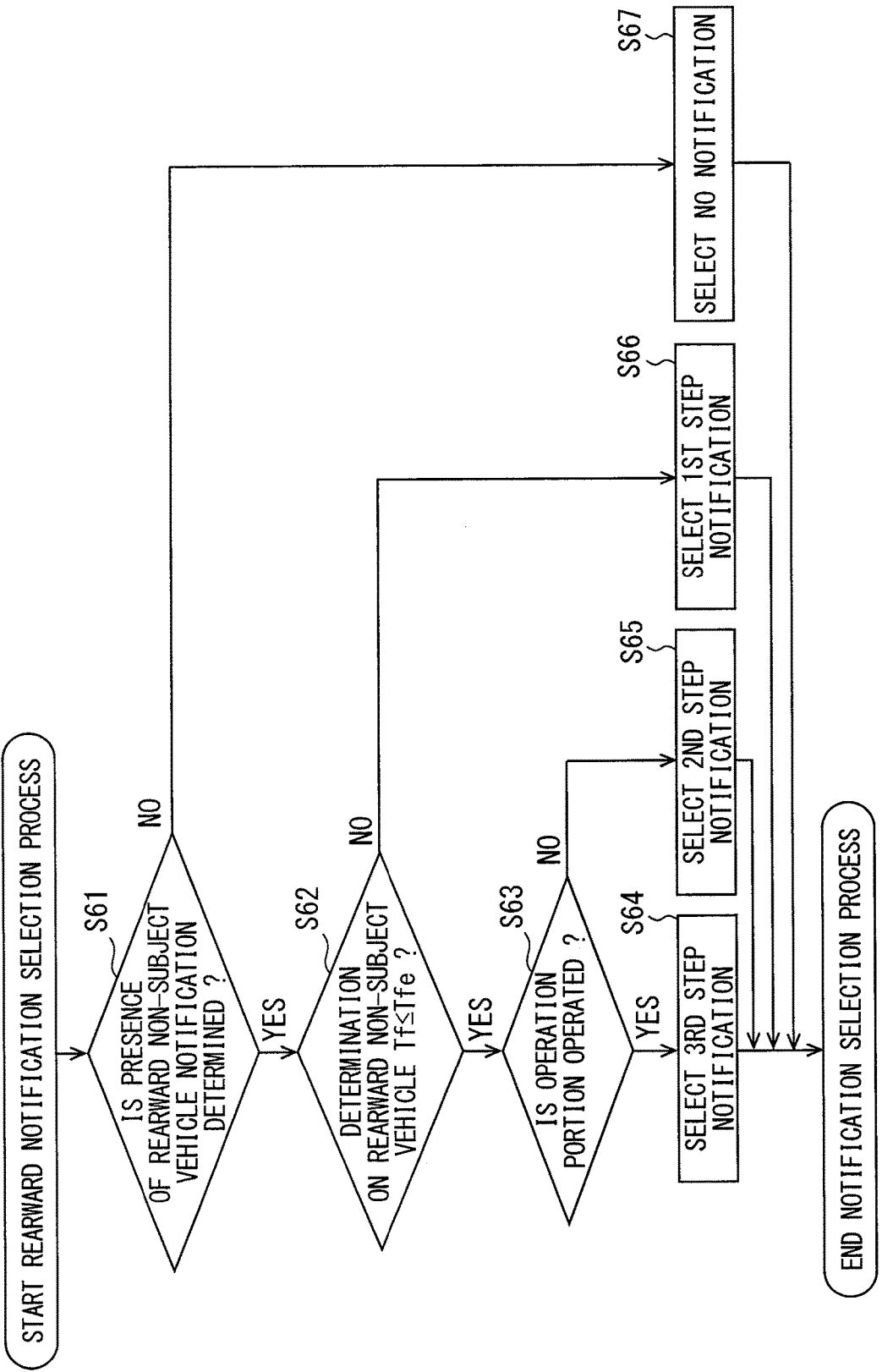
FIG. 6 is a flowchart illustrating rearward notification selection process of FIG. 3.

The rearward notification selection process in step S60 performed by the vehicle notification apparatus 100 will now be described more in detail using a flowchart of FIG. 6 as a sub-routine.

Firstly in step S61, a determination is made as to whether the presence of a notification signal of notification about the rearward non-subject vehicle is determined by the rearward notification determination process in step S50. When a positive determination is made in step S61, advancement is made to step S62. Meanwhile, when a negative determination is made in step S61, advancement is made to step S67.

In step S62, whether the available duration Tf for the rearward non-subject vehicle is equal to or shorter than a pre-set selection duration Tfe is determined. The pre-set selection duration Tfe is shorter than the pre-set duration Tfs. When a positive determination is made in step S62, advancement is made to step S63. Meanwhile, when a negative determination is made in step S62, advancement is made to step S66.

In step S63, whether the operation portion 4 is operated by the user is determined. When a positive determination is made in step S63, advancement is made to step S64. Meanwhile, when a negative determination is made in step S63, advancement is made to step S65.

In step S64, third step notification is selected. The rearward notification selection process is ended after step S64.

In step S65, second step notification is selected. The rearward notification selection process is ended after step S65.

In step S66, first step notification is selected. The rearward notification selection process is ended after step S66.

In step S67, no notification is selected. The rearward notification selection process is ended after step S67.

As to the steps of notification, the third step notification shows the highest urgency. Notification at each step will be described in detail in the following.

Upon input of the command signal in a case where the absence of a notification signal of notification about the rearward non-subject vehicle is determined in step S57 and no notification is selected in step S67, each of the devices 5, 6, and 7 updates a notification state and stops notification.

A description will now be given to the respective devices 5, 6, and 7 upon input of a notification signal when the presence of a notification signal of notification about the rearward non-subject vehicle is determined in step S56 and the first-step notification is selected in step S66.

Figure 9:
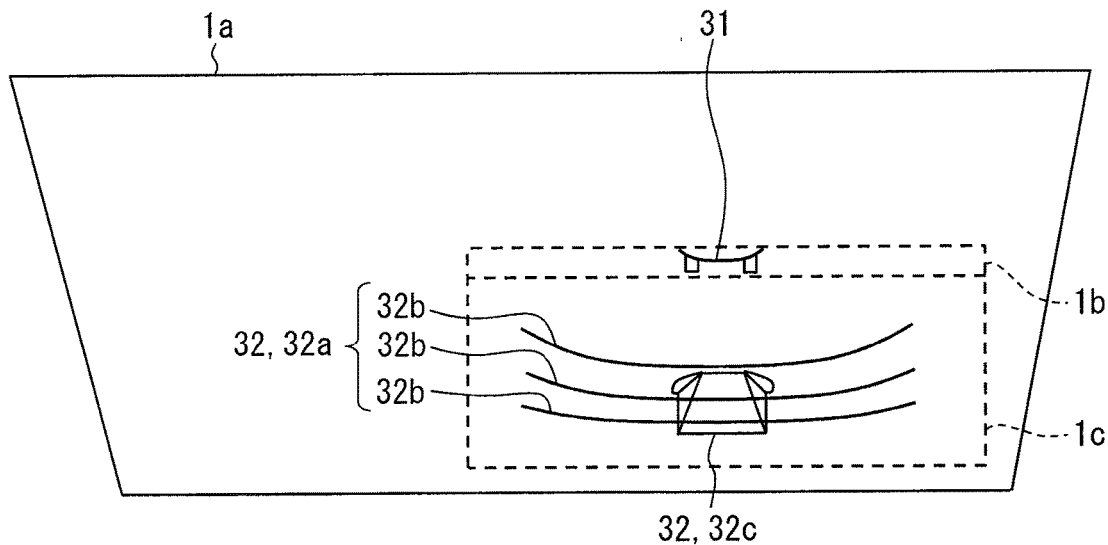
FIG. 9 is a schematic view showing an example of a notification state of the HUD apparatus when first-step notification in the first embodiment is selected.

As is shown in FIG. 9, the HUD apparatus 5 shows a rearward notification image 32 indicating that the rearward non-subject vehicle is approaching the subject vehicle 1 in the form of a virtual image. To be more specific, the rearward notification image 32 is displayed in a display region 1c disposed on a lower side of the display region 1b of the forward notification image 31 with respect to the subject vehicle 1. The rearward notification image 32 mainly includes a reference image 32a and a rearward non-subject vehicle image 32c. The reference image 32a of the present embodiment includes three linear line images 32b extending substantially along a traverse direction of the subject vehicle 1 and disposed in parallel side by side in a top-bottom direction of the subject vehicle 1. The rearward non-subject vehicle image 32c of the present embodiment is an image resembling a non-subject vehicle, and a relative display position with respect to the reference image 32a is determined according to a detection signal from the non-subject vehicle detection sensor 2. For example, in a case where the rearward non-subject vehicle and the subject vehicle 1 are present in a same lane, as is shown in FIG. 9, the rearward non-subject vehicle image 32c is displayed at a center of the reference image 32a. A relative display position of the rearward non-subject vehicle display 32c with respect to the reference image 32a in the top-bottom direction is determined by the available duration Tf of the rearward non-subject vehicle. In the case of FIG. 9, an upper end of the rearward non-subject vehicle image 32c is displayed at a position within the three line images 32b. In the manner as above, the HUD apparatus 5 provides notification about the rearward non-subject vehicle to the driver.

Meanwhile, each of the vibration devices 6 changes a current state to a state in which vibration for providing notification is deactivated. Likewise, the speaker 7 changes a current state to a state in which an output of a sound for providing notification is deactivated.

A description will now be given to the respective devices 5, 6, and 7 upon input of a notification signal when the presence of a notification signal of notification about the rearward non-subject vehicle is determined in step S56 and the second-step notification is selected in step S65.

Figure 10:
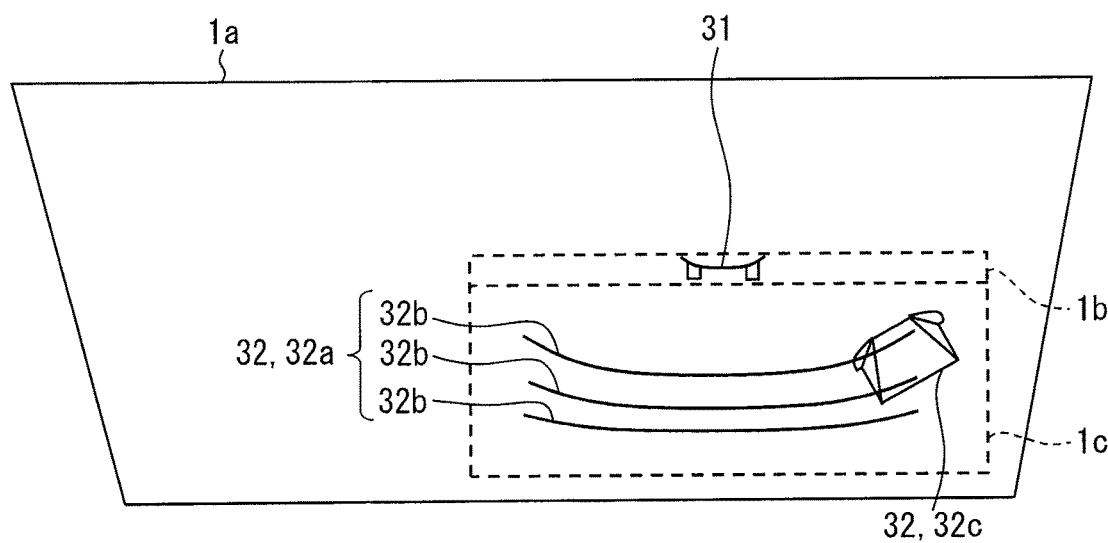
FIG. 10 is a schematic view showing an example of a notification state of the HUD apparatus when second-step notification in the first embodiment is selected.

As is shown in FIG. 10, the HUD apparatus 5 displays the rearward notification image 32 indicating that the rearward non-subject vehicle is approaching the subject vehicle 1 in the form of a virtual image. The second-step notification is different from the first-step notification in that, for example, because the available duration Tf is shorter than the pre-set duration Tfs (Tf<Tfs) (see step S62), the rearward non-subject vehicle image 32c is displayed by disposing the upper end above the three line images 32b, that is, at a position closer to the display region 1b of the forward notification image 31. FIG. 10 shows a case where the rearward non-subject vehicle is present in an immediate right lane of the subject vehicle 1. Hence, the rearward non-subject vehicle image 32c is displayed on a relatively right side of the reference image 32a.

Meanwhile, each of the vibration devices 6 changes a current state to a state in which vibrations for providing notification is deactivated similar to the first-step notification. Also, the speaker 7 changes a current state to a state in which an output of a sound for providing notification is deactivated similar to the first-step notification.

A description will now be given to the respective devices 5, 6, and 7 upon input of a notification signal when the presence of a notification signal of notification about the rearward non-subject vehicle is determined in step S56 and the third-step notification is selected in step S64.

The HUD apparatus 5 displays the rearward notification image 32 similar to the rearward notification image 32 displayed in the second-step notification shown in FIG. 10. However, a hue of the rearward notification image 32 displayed by the third-step notification is changed to a hue indicating a warning. Particularly in the present embodiment, the hue is changed to red from white. White is used in the first-step notification and the second-step notification.

The vibration devices 6 provide notification to the driver by vibration. The speaker 7 also provides notification to every occupant by outputting a sound. By the third-step notification as above, notification is provided to every occupant including the driver.

Descriptions will be given to a situation where the subject vehicle 1 equipped with the vehicle notification apparatus 100 as above travels on a two-lane expressway 40, which is a road where a lane change is allowed.

First Example

Figure 11:
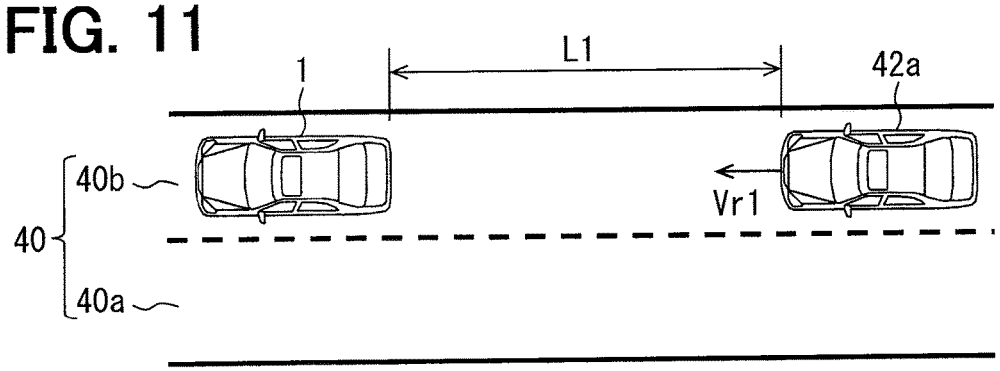
FIG. 11 is a schematic view showing the subject vehicle, a non-subject vehicle, and a road under a situation of a first example in the first embodiment.

As is shown in FIG. 11, the subject vehicle 1 is travelling in a high speed lane 40b and a rearward non-subject vehicle 42a is also travelling in the high speed lane 40b. A distance L1 between the subject vehicle 1 and the non-subject vehicle 42a is longer than the pre-set distance Lfs (L1>Lfs) and a relative speed of the non-subject vehicle 42a with respect to the subject vehicle 1 is Vr1. An available duration T1 is expressed as: T1=L1/Vr1, where Tfe<T1<Tfs.

In the rearward notification determination process in step S50, a positive determination is made in steps S51 and S52 and a negative determination is made in step S54. Because a positive determination is made in step S55, presence of a notification signal of notification about the rearward non-subject vehicle 42a is determined in step S56.

In the rearward notification selection process in step S60, a positive determination is made in step S61 whereas a negative determination is made in step S62. Hence, the first-step notification is selected in step S66.

Consequently, the HUD apparatus 5 shows the rearward notification image 32 as shown in, for example, FIG. 9 in the form of a virtual image.

In a situation of the first example as above, a risk that the subject vehicle 1 collides with the non-subject vehicle 42a is high because although the distance L1 is longer than the pre-set distance Tfs, the available duration T1 is shorter than the pre-set duration Tfs. Accordingly, notification is provided in order to alert the driver to avoid a collision.

Second Example

Figure 12:
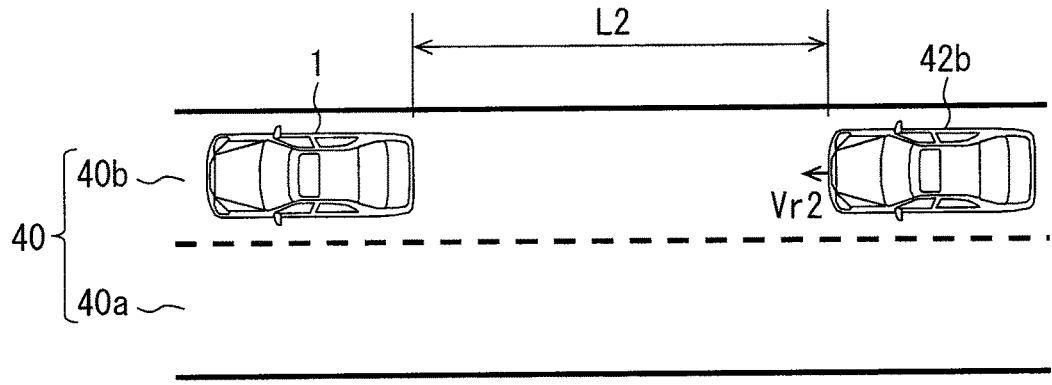
FIG. 12 is a schematic view showing the subject vehicle, a non-subject vehicle, and the road under a situation of a second example in the first embodiment.

As is shown in FIG. 12, the subject vehicle 1 is travelling in the high speed lane 40b and a rearward non-subject vehicle 42b is also travelling in the high speed lane 40b. A distance L2 between the subject vehicle 1 and the non-subject vehicle 42b is longer than the pre-set distance Lfs (L2>Lfs) and a relative speed of the non-subject vehicle 42b with respect to the subject vehicle 1 is Vr2. An available duration T2 is expressed as: T2=L2/Vr2. Herein, L2=L1, Vr2<Vr1, and T2>Tfs.

In the rearward notification determination process in step S50, a positive determination is made in steps S51 and S52 and a negative determination is made in steps S54 and S55. Hence, absence of a notification signal of notification about the rearward non-subject vehicle 42b is determined in step S57.

Consequently, notification about the rearward non-subject vehicle 42b by the respective devices 5, 6, and 7 is not carried out.

In a situation of the second example as above, a risk that the subject vehicle 1 collides with the non-subject vehicle 42b is low because although the distance L2 is equal to the distance L1 of the first example, the available duration T2 is longer than the pre-set duration Tfs. Accordingly, no notification is provided to the occupants in order to reduce bothersome notification.

Third Example

Figure 13:
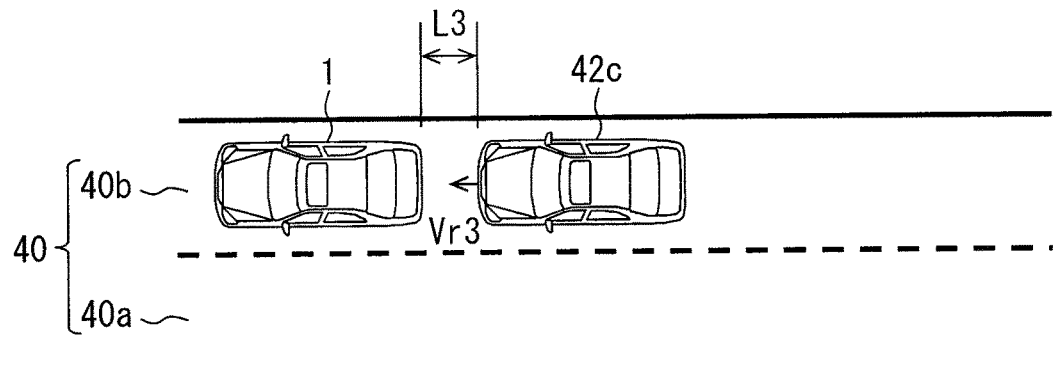
FIG. 13 is a schematic view showing the subject vehicle, a non-subject vehicle, and the road under a situation of a third example in the first embodiment.

As is shown in FIG. 13, the subject vehicle 1 is travelling in the high speed lane 40b and a rearward non-subject vehicle 42c is also travelling in the high speed lane 40b. A distance L3 between the subject vehicle 1 and the non-subject vehicle 42c is shorter than the pre-set distance Lfs (L3<Lfs) and a relative speed of the non-subject vehicle 42c with respect to the subject vehicle 1 is Vr3.

In the rearward notification determination process in step S50, a positive determination is made in steps S51, S52, and S54. Hence, presence of a notification signal of notification about the rearward non-subject vehicle 42c is determined in step S56.

In the rearward notification selection process in step S60, a positive determination is made in step S61 and a negative determination is made in step S62. Hence, the first-step notification is selected in step S66.

Consequently, the HUD apparatus 5 displays the rearward notification image 32 as shown in, for example, FIG. 9 in the form of a virtual display.

In a situation of the third example as above, a risk that the subject vehicle 1 collides with the non-subject vehicle 42c is high because the distance L3 is shorter than the pre-set distance Lfs. Accordingly, notification is provided in order to alert the driver to avoid a collision.

Fourth Example

Figure 14:
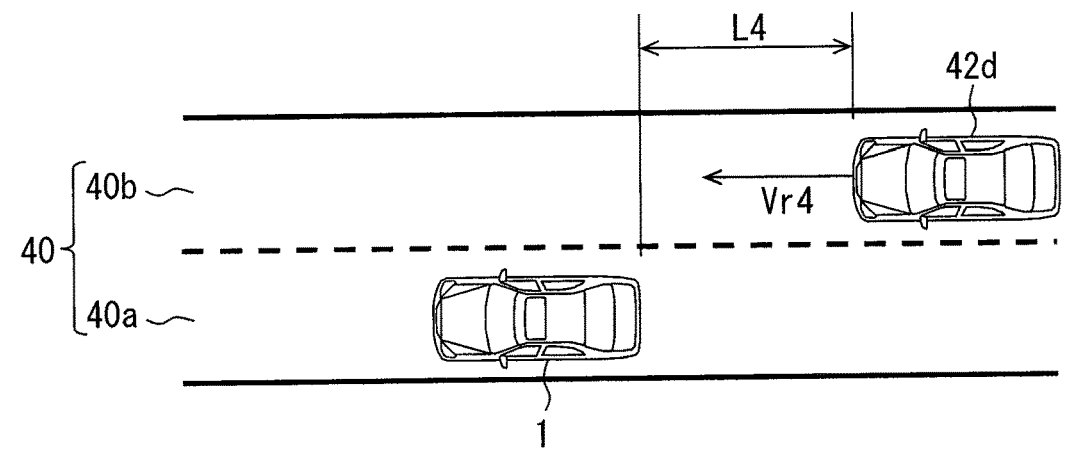
FIG. 14 is a schematic view showing the subject vehicle, a non-subject vehicle, and the road under a situation of a fourth example in the first embodiment.

As is shown in FIG. 14, the subject vehicle 1 is travelling in a driving lane 40a and a rearward non-subject vehicle 42d is travelling in the high speed lane 40b. A distance L4 between the subject vehicle 1 and the non-subject vehicle 42d is longer than the pre-set distance Lfs (L4>Lfs) and a relative speed of the non-subject vehicle 42d with respect to the subject vehicle 1 is Vr4. An available duration T4 is expressed as: T4=L4/Vr4, where T4<Tfe.

In the forward notification determination process in step S30, because no forward non-subject vehicle in front of the subject vehicle 1 is present in a same lane, a negative determination is made in step S31 and absence of a notification signal of notification about the forward non-subject vehicle is determined in step S35.

In the rearward notification determination process in step S50, a positive determination is made in step S51 whereas a negative determination is made in step S52. Because no non-subject vehicle in front of the subject vehicle 1 is present in the same lane, a negative determination is made in step S53. Hence, absence of a notification signal of notification about the rearward non-subject vehicle 42d is made in step S57.

Consequently, notification about the rearward non-subject vehicle 42d by the respective devices 5, 6, and 7 is deactivated.

In a situation of the fourth example as above, a risk that the subject vehicle 1 collides with the non-subject vehicle 42d is low because the subject vehicle 1 and the non-subject vehicle 42d are travelling in different lanes. Accordingly, no notification is provided to the occupants in order to reduce bothersome notification.

Fifth Example

Figure 15:
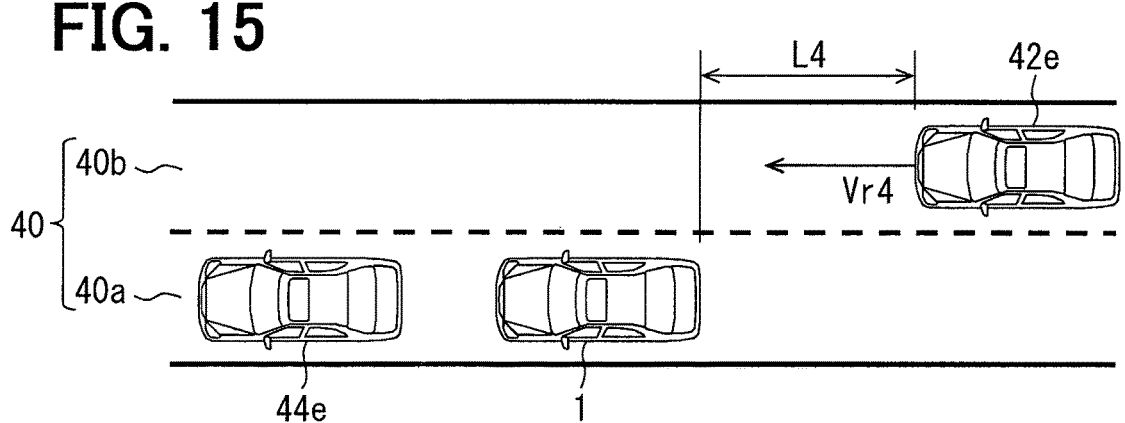
FIG. 15 is a schematic view showing the subject vehicle, non-subject vehicles, and the road under a situation of a fifth example in the first embodiment.

As is shown in FIG. 15, the subject vehicle 1 is travelling in the driving lane 40a and a rearward non-subject vehicle 42e is travelling in the high speed lane 40b. A distance between the subject vehicle 1 and the non-subject vehicle 42e is L4 and a relative speed of the non-subject vehicle 42e with respect to the subject vehicle 1 is Vr4. An available duration T4 is expressed as: T4=L4/Vr4.

Further, in the fifth example, a forward non-subject vehicle 44e and the subject vehicle 1 are travelling in the same driving lane 40a. Hence, presence of a notification signal of notification about the forward non-subject vehicle 44e is determined by the forward notification determination process in step S30.

In the rearward notification determination process in step S50, a positive determination is made in step S51 whereas a negative determination is made in step S52. Further, a positive determination is made in step S53 and a negative determination is made in step S54. Because a positive determination is made in step S55, presence of a notification signal of notification about the rearward non-subject vehicle 42e is determined in step S56.

In the rearward notification selection processing in step S60, a positive determination is made in step S61 and a positive determination is made in step S62. However, because a negative determination is made in step S63, the second-step notification is selected in step S65.

Consequently, the HUD apparatus 5 displays the image 30 as shown in FIG. 10 in the form of a virtual image.

In a situation of the fifth example as above, although the subject vehicle 1 and the non-subject vehicle 42e are travelling in the different lanes 40a and 40b, respectively, the presence of the forward non-subject vehicle 44e increases a probability that the subject vehicle 1 makes a lane change by changing from the lane 40a to the lane 40b in which the non-subject vehicle 42e is also travelling. Accordingly, notification is provided in order to alert the driver to avoid a collision.

Sixth Example

Figure 16:
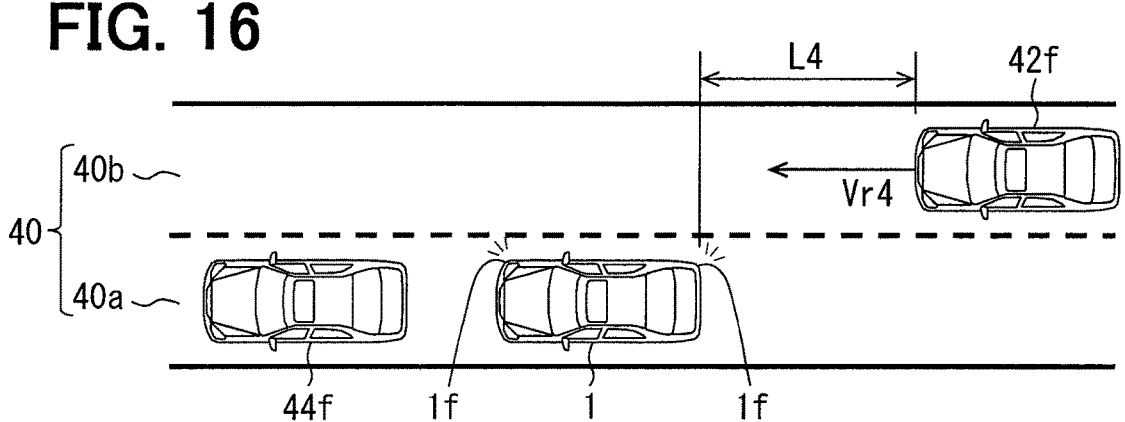
FIG. 16 is a schematic view showing the subject vehicle, non-subject vehicles, and the road under a situation of a sixth example in the first embodiment.

As is shown in FIG. 16, the subject vehicle 1 is travelling in the driving lane 40a and a rearward non-subject vehicle 42f is travelling in the high speed lane 40b. A distance between the subject vehicle 1 and the non-subject vehicle 42f is L4 and a relative speed of the non-subject vehicle 42f with respect to the subject vehicle 1 is Vr4. An allowance duration T4 is expressed as: T4=L4/Vr4.

As in the fifth example above, a forward non-subject vehicle 44f and the subject vehicle 1 are travelling in the same driving lane 40a. Hence, presence of a notification signal of notification about the forward non-subject vehicle 44f is determined by the forward notification determination process in step S30. It should be noted that, different from the fifth example above, the subject vehicle 1 is signaling the right direction indicators 1f in response to the operation made to the direction indicator switch which functions as the operation portion 4.

As in the fifth example above, presence of a notification signal of notification about the rearward non-subject vehicle 42f is determined by the rearward notification determination process in step S50.

In the rearward notification selection process in step S60, because a positive determination is made in steps S61 through S63, the third-step notification is selected in step S64.

Consequently, the HUD apparatus 5 displays the image 30 as shown in FIG. 10 in red in the form of a virtual image. The vibration devices 6 provide notification to the driver by vibrations. The speaker 7 also provides notification to every occupant by outputting an alert sound.

In a situation of the sixth example as above, the subject vehicle 1 most probably makes a lane change by changing from the lane 40a to the lane 40b in which the non-subject vehicle 42f is also travelling because the right direction indicators 1f of the subject vehicle 1 are signaling in situation of the fifth example above. Accordingly, the third-step notification is provided as a warning in order to alert the driver to avoid a collision.

In the first embodiment, the HUD apparatus 5, the vibration devices 6, and the speaker 7 together function as a notification portion, the step S20 executed by the control circuit 10 functions as a determination portion, the forward notification determination process in step S30 and the rearward notification determination process in step S50 executed by the control circuit 10 function as a notification determination portion, and the rearward notification selection process in step S60 executed by the control circuit 10 functions as a notification selection portion.

The following will describe advantages of the first embodiment described above.

According to the first embodiment, when the subject vehicle 1 is present on a road where a lane change is allowed, the presence or the absence of a notification signal of notification about a non-subject vehicle is determined according to a distance Lp, Lf between the subject vehicle and the non-subject vehicle and a relative speed Vrp, Vrf of the non-subject vehicle with respect to the subject vehicle 1. When configured in the manner as above, whether a collision is avoidable by a lane change is taken into consideration when the presence or the absence of notification is determined. In addition, even when the distance Lp or Lf is the same, the relative speed Vrp or Vrf is taken into consideration when a risk of a collision is considered. Hence, notification can be provided appropriately according to circumstance. Consequently, the vehicle notification apparatus 100 is capable of alerting the driver to avoid a collision with a non-subject vehicle while reducing bothersome notifications to the occupant(s) of the subject vehicle 1.

According to the first embodiment, even when the distances Lp and Lf are longer than the pre-set distances Lps and Lfs, respectively, presence of notification about the non-subject vehicle is determined when allowance durations Tp and Tf calculated from the distance Lp and the relative speed Vrp and from the distance Lf and the relative speed Vrf, respectively, are equal to or shorter than the pre-set durations Tps and Tfs, respectively. Accordingly, notification is triggered according to the allowance durations Tp and Tf left for the driver to avoid a collision. Consequently, bothersome notifications can be reduced and notification can be provided appropriately.

In a case where a rearward vehicle (that is, a rearward non-subject vehicle) is present in a lane different from a lane in which the subject vehicle 1 is travelling, a risk that the subject vehicle 1 makes an accidental contact with the rearward vehicle is increased with the lane change of the subject vehicle 1. On the other hand, the risk is not so high when the subject vehicle 1 does not change the travelling lane. When a forward vehicle (that is, a forward non-subject vehicle) is not present in the same lane with the subject vehicle 1, the subject vehicle 1 is less likely to change lanes than when the forward non-subject vehicle and the subject vehicle 1 are present in the same lane.

In view of the foregoing points, in the first embodiment, when the forward vehicle and the subject vehicle 1 are not present in the same lane, it is assumed that the subject vehicle 1 is least likely to change lanes, and absence of notification is determined independently of a distance to and a relative speed with respect to a rearward vehicle even when the rearward vehicle and the subject vehicle 1 are present in different lanes. Hence, providing of notification even when the risk is not so high can be avoided. Consequently, providing of bothersome notification can be reduced.

In the first embodiment, a method and a content of notification are selected according to driving operation made by an occupant on the operation portion 4 of the subject vehicle 1, the distance Lf, and the relative speed Vrf. Accordingly, the method and the content of notification as an outcome of the selection take a risk of a collision with the non-subject vehicle into consideration. When a risk of a collision varies with an operation made by the driver on the operation portion 4 of the subject vehicle 1, such a variance can be reflected in a method and a content of notification. Hence, notification can be provided appropriately according to different circumstances.

Second Embodiment

Figure 17:
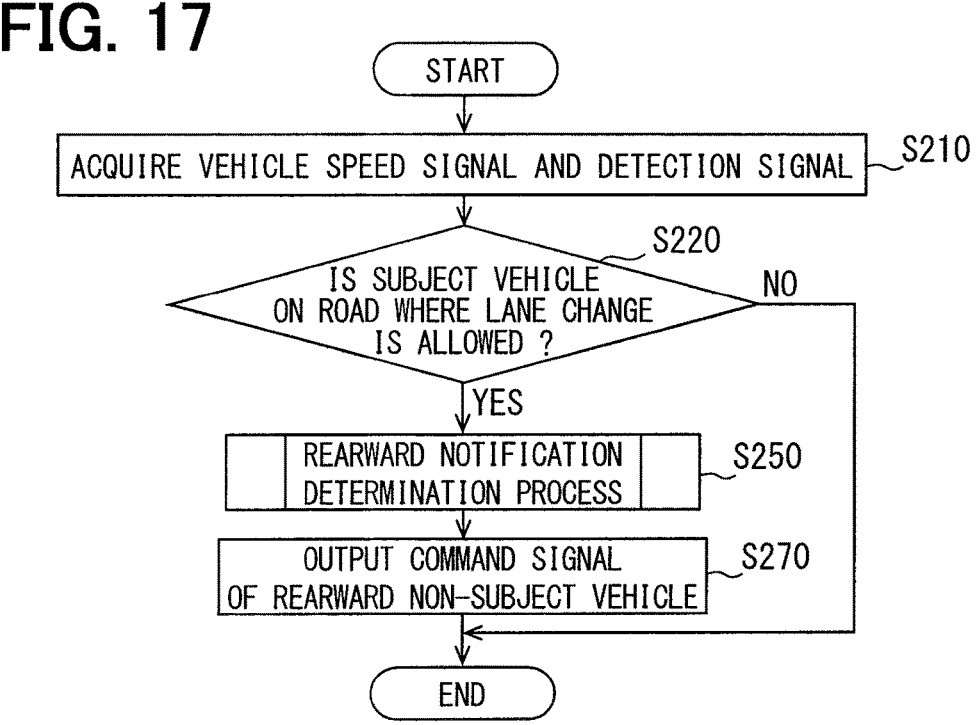
FIG. 17 is a flowchart related to a vehicle notification apparatus according to a second embodiment.
Figure 18:
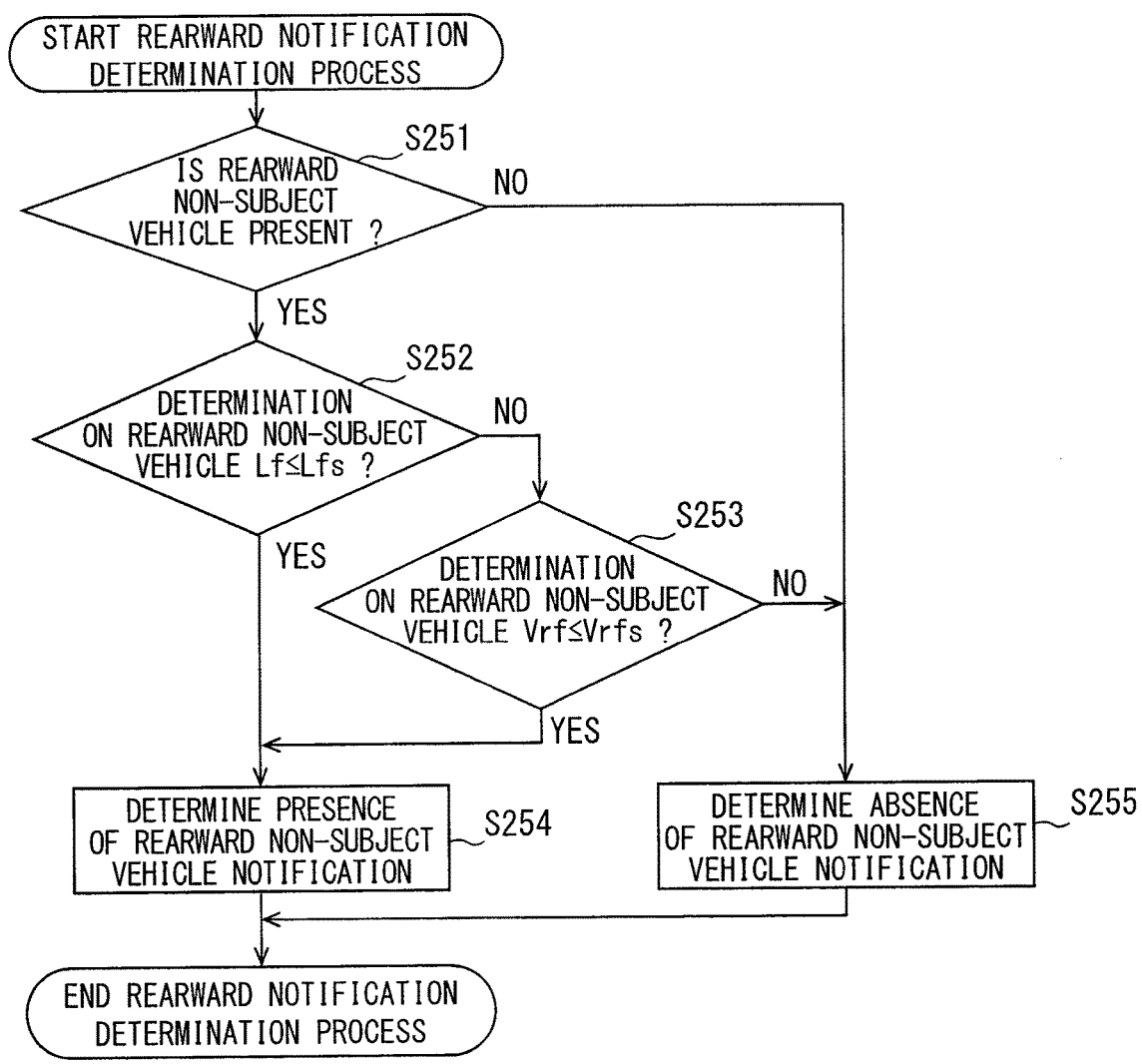
FIG. 18 is a flowchart illustrating rearward notification determination process of FIG. 17.

The following will describe a second embodiment of the present disclosure with reference to FIG. 17 and FIG. 18, which is a modification of the first embodiment described above. The second embodiment will be described mainly for a difference from the first embodiment above.

Flowcharts performed by running computer programs in the second embodiment will be described in detail according to FIG. 17 and FIG. 18. Process in accordance with the flowchart shown in FIG. 17 is performed, for example, at predetermined intervals.

Process in steps S210 and S220 is similar to the process, respectively, in S10 and S20 of the first embodiment above and detailed description will be omitted. When a positive determination is made in step S220, advancement is made to step S250.

In step S250, rearward notification determination process of notification about a rearward non-subject vehicle is performed. More specifically, presence or absence of a notification signal of notification about a non-subject vehicle is determined according to a distance Lf between a subject vehicle 1 and the non-subject vehicle and a relative speed Vrf of the non-subject vehicle with respect to the subject vehicle 1. When process in step S250 is ended, advancement is made to step S270.

In step S270, similar to S70 of the first embodiment above, a command signal of notification about the rearward non-subject vehicle is outputted to a HUD apparatus 5, vibration devices 6, and a speaker 7. For example, when the presence of a notification signal is determined in step S250, the notification signal is outputted as a command signal. The process is ended after step S270.

The rearward notification determination process in step S250 will now be described more in detail with reference to the flowchart of FIG. 18 as a sub-routine.

Firstly in step S251, whether a rearward non-subject vehicle is present is determined. When a positive determination is made in step S251, advancement is made to step S252. Meanwhile, when a negative determination is made in step S251, advancement is made to step S255.

In step S252, whether the distance Lf to the rearward non-subject vehicle is equal to or shorter than a pre-set distance Lfs is determined. When a positive determination is made in step S252, advancement is made to step S254. Meanwhile, when a negative determination is made in step S252, advancement is made to step S253.

In step S253, whether the relative speed Vrf of the rearward non-subject vehicle is equal or higher than a pre-set speed Vrfs is determined. When a positive determination is made in step S253, advancement is made in step S254. Meanwhile, when a negative determination is made in step S253, advancement is made to step S255.

In step S254, presence of a notification signal of notification about the rearward non-subject vehicle is determined. The rearward notification determination process is ended after step S254.

In step S255, absence of a notification signal of notification about the rearward non-subject vehicle is determined. The rearward notification determination process is ended after step S255.

Similar to the first embodiment, in the second embodiment describe as above, when it is determined that the subject vehicle 1 is present on a road where a lane change is allowed, presence or absence of a notification signal is determined according to the distance Lf between the subject vehicle 1 and the non-subject vehicle and the relative speed Vrf of the non-subject vehicle with respect to the subject vehicle 1. Hence, advantages similar to the advantages of the first embodiment described above can be provided.

Also, according to the second embodiment, presence of notification about the non-subject vehicle is determined in a case where the relative speed Vrf is equal to or higher than the pre-set speed Vrfs even when the distance Lf is longer than the pre-set distance Lfs. Even when the distance Lf is long, a risk of a collision is increased when the relative speed Vrf is high because the non-subject vehicle is approaching quickly. Accordingly, the presence of notification is determined in the case as above.

In the second embodiment, the HUD apparatus 5, the vibration devices 6, and the speaker 7 together functions as a notification portion, the step S220 executed by the control circuit 10 functions as a determination portion, and the rearward notification determination process executed in step S250 by the control circuit 10 functions as a notification determination portion.

Other Embodiments

While the above has described several embodiments of the present disclosure, it should be appreciated that interpretations of the present disclosure are not limited to the embodiments above. The respective embodiments can be modified in various manners and combined suitably within the scope of the present disclosure.

More specifically, according to a first modification of the first and second embodiments above, a vehicle notification apparatus 100 may output a notification signal to devices other than the HUD apparatus 5, vibration devices 6, and the speaker 7. For example, a combination meter, a car navigation system, or an electronic mirror may display a real image instead of virtual image for providing notification to the occupants upon input of a notification signal. Alternatively, for example, a turning on of LED in response to an input of a notification signal may be used as the notification to the occupants. Further, for example, a wheel vibration in response to an input of a notification signal may be used as the notification to the driver.

According to a second modification of the first and second embodiments above, a distance Lp or Lf between a subject vehicle 1 and a non-subject vehicle and a relative speed Vrp or Vrf of the non-subject vehicle with respect to the subject vehicle 1 may be acquired by vehicle-to-vehicle communications or vehicle-to-roadside communications.

According to a third modification of the first and second embodiments above, whether a subject vehicle 1 is present on a road where a lane change is allowed may be determined by using a GPS or the like.

According to a fourth modification of the first and second embodiments above, various means become available under a condition that when it is determined that the subject vehicle 1 is present on a road where a lane change is allowed, presence or absence of a notification signal is determined according to the distance Lp or Lf between the subject vehicle 1 and the non-subject vehicle and the relative speed Vrp or Vrf of the non-subject vehicle with respect to the subject vehicle 1. For example, pre-set distances Lps and Lfs and pre-set durations Tps and Tfs (or pre-set speed Vrfs) may be adjusted according to a positional relation with the non-subject vehicle and a line shape of a road. Alternatively, for example, presence or absence of a notification signal may be determined by a return value of a function (for example, a special parameter) between the distances Lp and Lf with the relative speeds Vrp and Vrf, respectively. Further, for example, presence or absence of a notification signal may be determined according to the distance Lp or Lf, the relative speed Vrp or Vrf, and an acceleration of the subject vehicle.

It is noted that a flowchart or the processing of the flowchart in the present disclosure includes portions (also referred to as steps), each of which is represented, for instance, as S100. Further, each portion can be divided into several sub-portions while several portions can be combined into a single portion. Furthermore, each of thus configured portions can be also referred to as a circuit, device, module, or means.

Each or any combination of portions explained in the above can be achieved as (i) a software portion in combination with a hardware unit (e.g., computer) or (ii) a hardware portion, including or not including a function of a related apparatus; furthermore, the hardware portion (e.g., integrated circuit, hard-wired logic circuit) may be constructed inside of a microcomputer.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

What is claimed is:

1. A vehicle notification apparatus equipped to a subject vehicle having at least one of a heads-up display that provides a display notification to an occupant, a vibration device that provides a vibration notification to the occupant, and a speaker that provides an audio notification to the occupant, the vehicle notification apparatus comprising an electronic control unit configured to:
   determine whether the subject vehicle is travelling on a road where a lane change is allowed;
   determine whether to output a notification signal to at least one of the heads-up display, the vibration device, and the speaker based on a distance between the subject vehicle and a non-subject vehicle and a relative speed of the non-subject vehicle with respect to the subject vehicle when the electronic control unit determines that the subject vehicle is travelling on the road where the lane change is allowed;
   determine whether a rearward non-subject vehicle is following the subject vehicle in a different lane from the subject vehicle and whether a forward non-subject vehicle is travelling in front of the subject vehicle in a same lane as the subject vehicle; and
   determine not to output the notification signal to any of the heads-up display, the vibration device, and the speaker regardless of a distance between the rearward non-subject vehicle and the subject vehicle and a relative speed of the rearward non-subject vehicle with respect to the subject vehicle when the electronic control unit determines that the rearward non-subject is following the subject vehicle in the different lane from the subject vehicle and that there is no forward non-subject vehicle travelling in front of the subject vehicle in the same lane as the subject vehicle;
   wherein:

the electronic control unit determines whether to output a first notification signal about the rearward non-subject vehicle after determining whether to output a second notification signal about the forward non-subject vehicle, in a determination of whether to output the first notification signal about the rearward non-subject vehicle, when the subject vehicle and the rearward non-subject vehicle are travelling in different lanes and the forward non-subject vehicle is not travelling in front of the subject vehicle in the same lane, the electronic control unit does not output the first notification signal about the rearward non-subject vehicle without consideration of the distance to the rearward non-subject vehicle and the relative speed of the rearward non-subject vehicle, and in the determination of whether to output the first notification signal about the rearward non-subject vehicle, the electronic control unit determines whether the forward non-subject vehicle is traveling in the same lane as the subject vehicle with reference to a determination result of whether to output the second notification signal about the forward non-subject vehicle.

2. The vehicle notification apparatus according to claim 1, wherein the electronic control unit outputs the notification signal to at least one of the heads-up display, the vibration device, and the speaker when the distance between the subject vehicle and the non-subject vehicle is greater than a pre-set distance and an available duration, which is calculated based on the distance between the subject vehicle and the non-subject vehicle and the relative speed of the non-subject vehicle with respect to the subject vehicle, is equal to or shorter than a pre-set duration.

3. The vehicle notification apparatus according to claim 1, wherein the electronic control unit outputs the notification signal to at least one of the heads-up display, the vibration device, and the speaker when the distance between the subject vehicle and the non-subject vehicle is equal to or shorter than a pre-set distance, and the electronic control unit outputs the notification signal to at least one of the heads-up display, the vibration device, and the speaker when the distance between the subject vehicle and the non-subject vehicle is greater than the pre-set distance and the relative speed of the non-subject vehicle with respect to the subject vehicle is equal to or greater than a predetermined speed.

4. The vehicle notification apparatus according to claim 1, wherein the electronic control unit is further configured to select at least one device from the heads-up display, the vibration device, and the speaker to receive the notification signal based on a driving operation made by the occupant on an operation portion of the subject vehicle, the distance between the subject vehicle and the non-subject vehicle, and the relative speed of the non-subject vehicle with respect to the subject vehicle; and output the notification signal to the at least one selected device.

* * * * *